June 17, 1969 N. TREGUBENKO 3,449,813

APPARATUS FOR THE PROGRAMMED INSERTION OF TERMINALS

Filed Oct. 10, 1966 Sheet 1 of 6

INVENTOR.
NICALOS TREGUBENKO
BY
Robert R. Shanton
ATTORNEY.

INVENTOR.
NICALOS TREGUBENKO
BY
Robert R. Thornton
ATTORNEY.

INVENTOR.
NICALOS TREGUBENKO
BY
Robert R. Thornton
ATTORNEY.

INVENTOR.
NICALOS TREGUBENKO
BY
Robert R. Thornton
ATTORNEY.

INVENTOR.
NICALOS TREGUBENKO
BY
Robert R. Thornton
ATTORNEY

INVENTOR.
NICALOS TREGUBENKO
BY
Robert R. Thornton
ATTORNEY.

United States Patent Office 3,449,813

Patented June 17, 1969

3,449,813
APPARATUS FOR THE PROGRAMMED INSERTION OF TERMINALS

Nicolas Tregubenko, San Pedro, Calif., assignor to Allied Pacific Manufacturing Company, Compton, Calif., a corporation of California Filed Oct. 10, 1966, Ser. No. 585,578
Int. Cl. H05k *3/20*
U.S. Cl. 29—203 7 Claims This invention relates to the programmed insertion of devices such as electrical terminals and the like by incremental feed.

In the fabrication of various types of equipment, and particularly printed circuit boards for electronic equipment and the like, it is necessary to insert a series of identical parts in a specific spaced relationship, and, where desired, provide blank spaces in the relationship. For example, the insertion of electrical terminals in a printed circuit board is relatively simple if all available terminal positions are to be filled. However, the normal practice is to provide a series of terminal positions in standard relationship, and circuit boards for particular circuits will utilize some, but not all, of these terminal positions. Thus, one circuit on a board may utilize a board having eight terminals with equal spacing between, while the same board, when utilized with a different circuit, may only utilize five terminals, with the three vacant terminal positions located between the first and last terminals, so that the terminals appeared in a pre-selected spaced arrangement.

Initially, when it was desired to provide such a spacing of electrical terminals, the particular circuit board to be used had each terminal inserted therein by hand in the specific sequence which was to appear. Such a procedure was extremely time consuming as well as laborious and, in addition, was susceptible to error, in that each board was individually processed by hand. In order to avoid some of the errors inherent in such a procedure, the use of carriers was instituted, in which the carriers received the terminals, and the printed circuit boards where then impressed on the carriers, so as to remove the terminals in the desired sequence. This procedure enabled the carrier to be checked for correct terminal positioning prior to actually inserting the terminal in the board, and so eliminated certain of the disadvantages of the original hand insertion procedure. However, hand insertion of the terminals in the carriers was still required, and so was susceptible to human error, necessitating checking the carriers to insure proper terminal insertion. As the demand for printed circuit boards containing terminals of this type has increased, the expense and time required in manual insertion of each terminal in the carrier has become significant, and so even the use of such carriers has not proved completely satisfactory in recent years. A great saving in both time and expense would be provided by a device which would automatically program the insertion of the terminals into the carrier.

According to the present invention, automatic programming of terminal insertion in a carrier is provided by preselecting the operation sequence of an automatic terminal insertion device. In the apparatus of the invention, a carrier, or boat, having recesses adapted to receive terminals, is passed adjacent terminal insertion means, the operation of which is controlled so as to insert terminals in the boat recesses in the desired sequence. In order to provide for such operation, means are provided for selectively actuating the terminal insertion means in accordance with a pre-selected program, and which includes a programmer which carries the program of terminal insertion and controls the movement of the boat adjacent the terminal insertion means, as well as the actuation of the terminal insertion means.

The invention may be more readily understood by referring to the accompanying drawings in which:

FIGURE 1 is a view in perspective of a terminal board of the printed circuit type which contains a plurality of terminals of each of two sizes;

FIGURE 2, parts A and B taken together, consists of a plan view and side elevation of a boat or carrier;

In order to understand the nature of the invention, preliminary to discussing the invention, the particular application of the invention with respect to insertion of terminals into terminal boards by means of terminal placement in carriers or boats will be described. Both the terminal boards, described hereinafter with respect to FIGURE 1, and the boats or carriers, with respect to FIGURE 2, are in the prior art.

Figure 1:
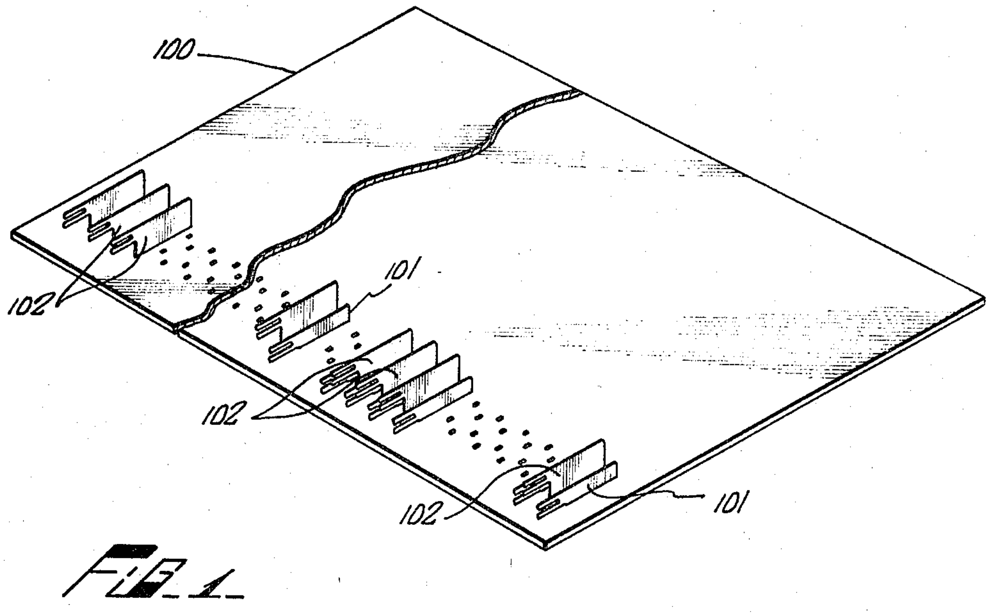

FIGURE 1 is a perspective of a terminal board 100 containing a series of first terminals 101 and second terminals 102, the second terminals differing in size from the first terminals. The terminal board is of conventional structure, as are the terminals, and the terminals are electrically connected to the board by any conventional means, such as dip soldering, for example. In the particular example shown, the terminal board 100 is a printed circuit board which is adapted to be inserted in an electrical device so that the terminals 101, 102 make the appropriate electrical circuit connections between the printed circuits of the board 100 and the circuits of the device (not shown).

Figure 2A:
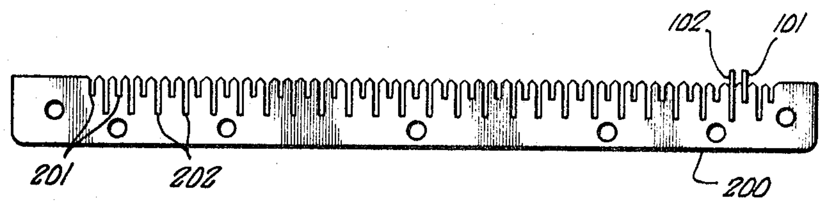
Figure 2B:
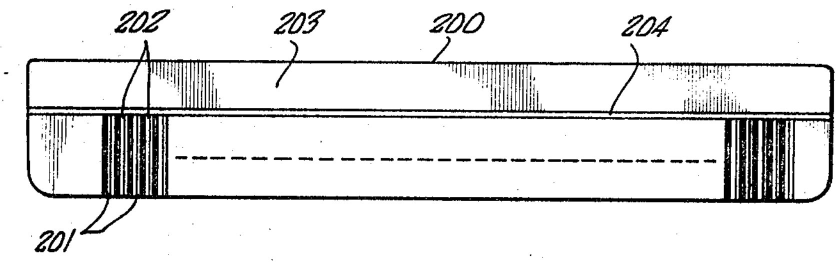

In FIGURE 2, there is shown a device 200, hereinafter referred to as a "boat," which is of conventional construction and is utilized to set up the alignment of terminals 101, 102 to be inserted in the terminal board 100. Thus, in FIGURE 2A, it is seen that the boat 200, when viewed in its side elevation, has a first series of recesses 201 and a second series of recesses 202. The second series of receses 202 are greater in depth than the first series of recesses 201. The boat 200 has the appropriate terminals 101, 102 disposed in said recesses so as to provide the terminal distribution shown as inserted in the board 100 of FIGURE 1. The boat 200 has a shoulder 203 which acts as a stop for the terminals 101, 102. The shoulder 203 has a chamfer 204 at its edge in order to assist in inserting the terminals 101, 102 in the recesses 201, 202. In the prior art, the terminals 101, 102 were inserted into the recesses 201, 202 manually and the selection of the particular arrangement of terminal distribution was made at the time of insertion by the person making the insertion. The boat was then aligned with the board within which the terminals were to be fixed, and the terminals transferred to the board, usually, by forcing the board against the boat so that the terminal contacts became inserted in appropriate holes in the boat. The removal of the board from the boat then carried the terminals with the board, leaving the boat empty and ready to be refilled with new terminals.

Figure 3:
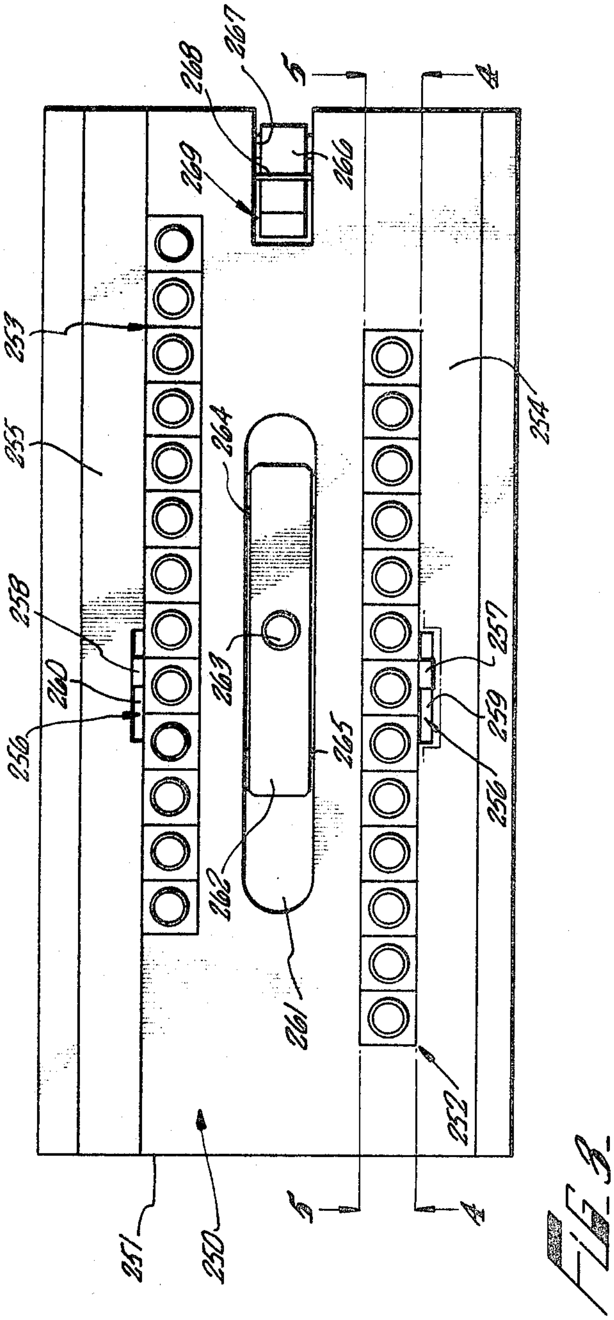
FIGURE 3 is a plan view of a programmer according to the invention.

FIGURE 3 is a plan view of a programmer which is utilized in the invention to provide incremental feed in terminal inserton and to program the insertion of the termnals into the boat. In FIGURE 3, a programmer 250 includes a main body portion 251, sometimes hereinafter referred to as the "ratchet block." Extending upwardly from the ratchet block 251 are a first line of pins 252 and a second line of pins 253. The pin alignments 252, 253 are held in place against the ratchet block 251, by a first slide plate 254 and a second slide plate 255. The slide plates 254, 255 are connected to the ratchet block 251 by any conventional means, such as bolts. The slide plates 254, 255 each have a recess 256 formed adjacent the respective pin alignments 252, 253, through which extend locking rod pins 257, 258, respectively, which extend outwardly from locking rods 259, 260. The locking rods 259, 260 are disposed between the slide plates 254, 255 and the pin alignments 252, 253, as will be explained further hereinafter. In the central portion of the ratchet block 251, a recess 261 is formed, within which is disposed a programmer clearing block 262, from which a manual actuator pin 263 extends upwardly. The block 262 is held in position in the recess 261 by means of a pair of pins 264, 265, the purpose of which will be explained hereinafter. At one end of the programmer 250, in a recess 269, a spring loaded pawl 266 is mounted on a pivot pin 267. The pawl is spring loaded so as to rotate counter-clockwise, and this rotation is limited by a stop pin 268, which permits the pawl to extend above the surface of the ratchet block 251, to act as a stop. In operation, the boat 200 slides over the pawl 266 toward the recess 261, eventually covering the recess 261, and the pawl 266, when the boat 200 has cleared it, rides up so as to prevent reverse motion of the boat. This function will be more apparent with respect to FIGURE 8.

Figure 4:
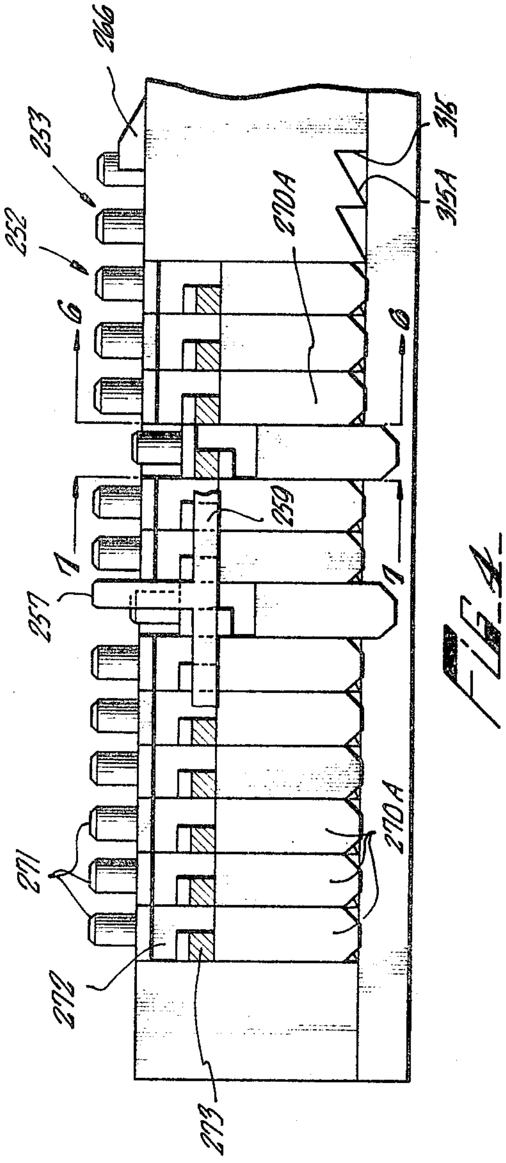
FIGURE 4 is a sectional view taken along lines 4—4 of FIGURE 3.

FIGURE 4 is a partial sectional view taken along line 4—4 of FIGURE 3, to illustrate the operation of the locking bar 259. In FIGURE 4, the first pin alignment 252 is seen in side elevation to consist of a series of pins 270, each of which terminates in a cap 271. Each of the pins 270 has a C-shaped recess 272 formed therein. The locking bar 259 has a series of locking teeth 273 projecting inwardly therefrom so as to extend into the C-shaped recess and, in the position shown in FIGURE 4, to lock each of the pins 270 in the position shown against vertical displacement, as the teeth 273 fit in one leg of the C-shaped recess, whether the pins are in their upper disposition, as indicated by pins 270A or in their lower disposition, as indicated by pins 270B. Lateral displacement of the locking bar 259 removes the teeth 273 from the leg portions of the recesses 272, thus permitting the pins to be displaced vertically.

Figure 5:
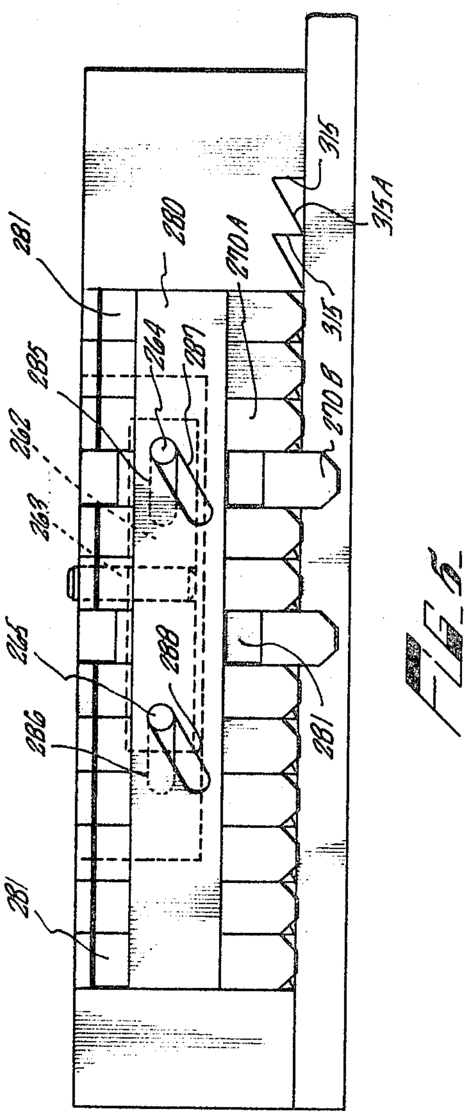
FIGURE 5 is a sectional view taken along lines 5—5 of FIGURRE 3.

In the operation of the programmer, programming is controlled by the selection of pins 270 which are vertically displaced. In order to initially clear the programmer, prior to setting up the desired program, a clearing mechanism is provided. In FIGURE 5, which is taken along line 5—5 of FIGURE 3, the pin caps 271 have been deleted for purposes of clarity. Also, the programmer clearing block 262 and manual actuator pin 263 are shown in dotted lines to indicate their relative dispositions. A clearing bar 280 is disposed within recesses 281 formed in the pins 270. The vertical position of the clearing bar 280 is controlled by longitudinal movement of the pins 264, 265 through a pair of elongated apertures 285, 286, shown in dotted lines in FIGURE 5, which extend through the ratchet block 251. The clearing bar 280 has a pair of elongated apertures 287, 288, which are angularly displaced from the apertures 285, 286 in the ratchet block 251. Thus, the longitudinal movement of the clearing block, to the left as shown in FIGURE 5, by manual movement of the pin 263, causes the clearing block 280 to rise vertically, thus moving all of the pins 270B to the upper alignment conforming with the pins 270A. Recalling the locking bar operation of FIGURE 4, it will be apparent that the locking bar must be moved to its unlocked position before the clearing bar can be actuated.

Figure 7:
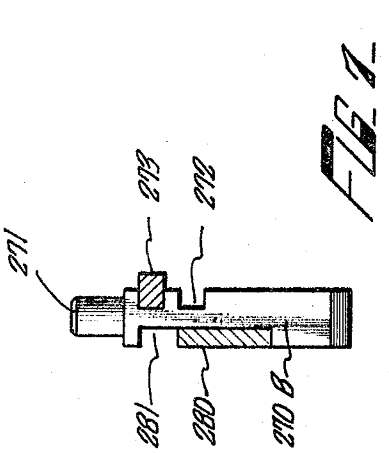
FIGURE 7 is a partial sectional view of a portion of the programmer of FIGURE 3 taken along lines 7—7 of FIGURE 4.
Figure 6:
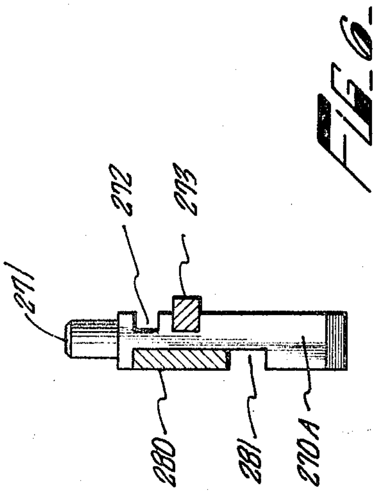
FIGURE 6 is a partial sectional view of a portion of the programmer of FIGURE 3 and taken along line 6—6 of FIGURE 4.

The operation of the locking and clearing bars will become more clear by reference to FIGURES 6 and 7, which show the locking and clearing bar dispositions with respect to the pins locked in both their upper and lower dispositions. It will be noted that FIGURE 6 is taken along line 6—6 of FIGURE 4, and FIGURE 7, along line 7—7 of FIGURE 4.

Figure 8:
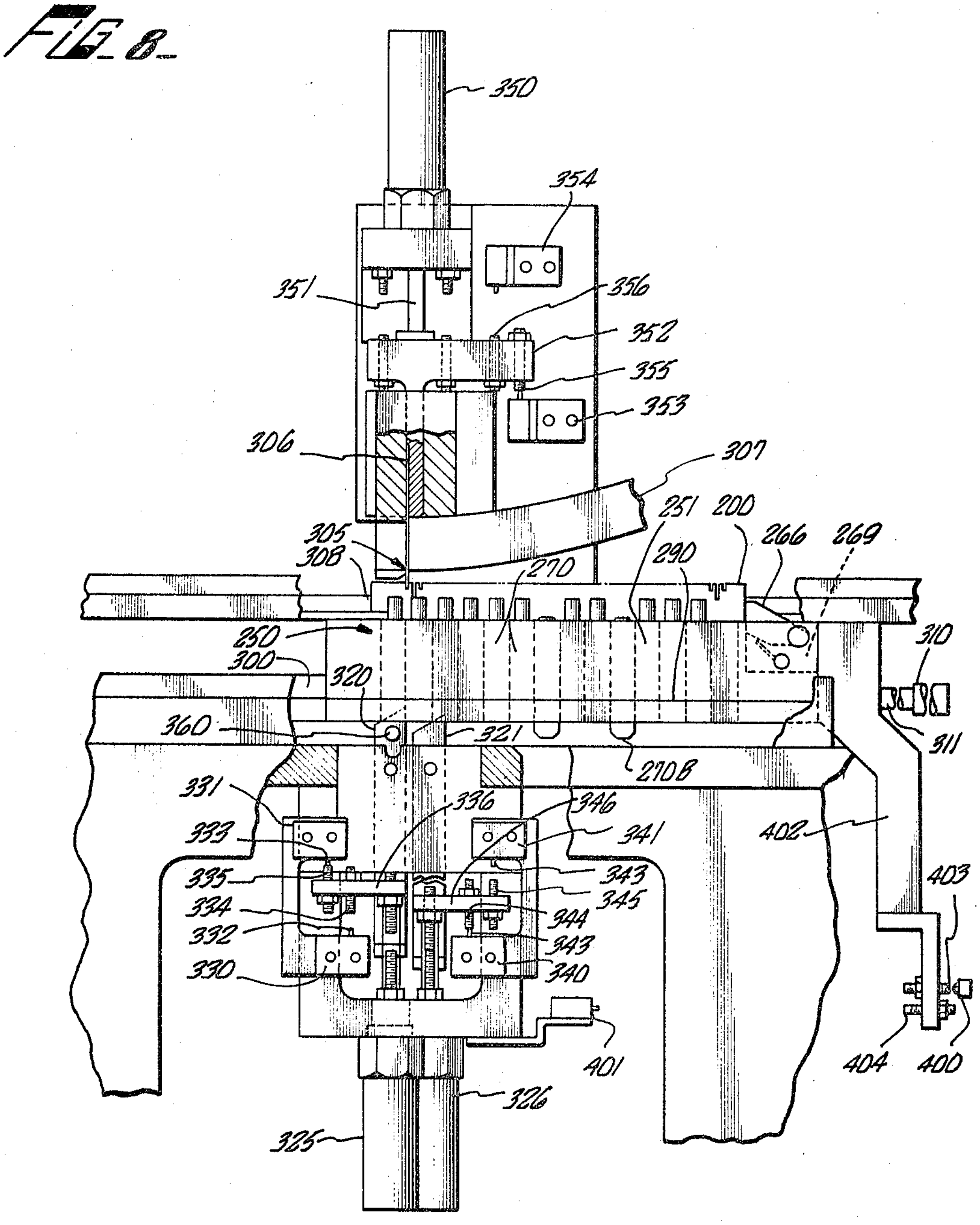
FIGURE 8 is a side elevation of a device for inserting terminals in accordance with the present invention.

FIGURE 8 is a side elevation, partially in section, illustrating the invention. In FIGURE 8, the boat 200 is shown as being disposed in the programmer 250 in position to have a terminal inserted in the first of the boat terminal recesses 201. The programmer slide plates 251 have shoulders 290 which ride under guide rails 300 on the machine chassis, so as to hold the programmer in position.

A terminal feeder station 305 includes a plunger 306 and a track 307 which is filled with the terminals to be inserted in the openings 201 of the boat 200, it being noted that the recesses 201 differ in size from the recesses 202. In the operation of the device illustrated, terminals are inserted, at a maximum, in alternate openings, so that at a single terminal insertion station only the recesses 201 or the recesses 202, but never both, are filled in sequence. Thus, for the device shown, a second terminal insertion station will be utilized to fill the recesses 202 in the boat 200. The boat 200 rides against a first guide bar 308, and is urged thereagainst by a second guide bar 300A, not shown, see FIGURE 9, which is spring loaded. These guide bars are disposed over the ratchet block 251 and support the boat 200. Thus, the boat 200 is held by frictional engagement and the pawl 266 in fixed disposition relative to the programmer 250 while at the terminal insertion station.

Movement of the programmer 250, and therefore the boat 200, is accomplished through drive provided by an air cylinder 310 and drive shaft 311. As shown in FIGURE 8, the boat is in position to have a terminal inserted in its first recess 201, so that the boat continues to move, in FIGURE 8, from right to left under the influence of the air cylinder 310. The ratchet block 251 has a series of ratchet teeth 315 and faces 315A formed laterally across its lower surface, as shown in more detail in FIGURES 10 and 11. A pair of plungers 320, 321 are disposed beneath the programmer 250 at the terminal insertion location 305. The plungers 320, 321 are both laterally and longitudinally offset one from another. As will be explained in more detail with respect to FIGURES 10 and 11, when a terminal is to be inserted in each of the recesses 201 of the boat, the plungers 320, 321 will alternately engage the ratchet teeth 315 of the programmer.

The plungers 320, 321 are connected to air cylinders 325, 326 which function as the plunger drives. The cylinder 325 drive motion direction is controlled by a pair of switches 330, 331, which are actuated by having their switch arms 332, 333 contacted by actuator studs 334, 335 mounted on an actuator arm 336. The actuator arm is attached to the plunger. Thus, downward movement of the plunger 320 causes the stud 334 to contact the switch arm 332, thus closing the switch 330, and withdraws the plunger 320 from engagement with the ratchet teeth 315. Closure of the switch 330 causes the air cylinder 325 drive to reverse its direction of motion, thus causing the plunger 320 to move toward the ratchet teeth 315. A similar set of switches 340, 341, switch arms 342, 343 and actuator studs 344, 345 and actuator arm 346 are associated with the plunger 321.

When either the switch 331 or the switch 341 is closed, a terminal is inserted in the boat by movement of the plunger 306. Movement of the plunger 306 is instituted by actuation of the plunger air cylinder 350 by the switches 331, 341. The plunger 306 has a plunger arm 351 which connects the plunger to the air cylinder 350. Attached to the plunger arm 351 is a switch arm 352 which actuates a pair of switches 353, 354 in response to plunger arm movement. It will be seen that the switch 353 is actuated by an actuator stud 355 mounted on the actuator arm 352, and the switch 354, by an actuator stud 356. Downward movement of the plunger arm 351 in response to actuation of the air cylinder 350, in addition to inserting a terminal in the boat, actuates the switch 353. Actuation of the switch 353 reverses the direction of movement of the plunger arm 351, so as to withdraw the plunger from the terminal inserting position, ultimately actuating switch 354 which deactuates switch 353.

Figures 10, 11:
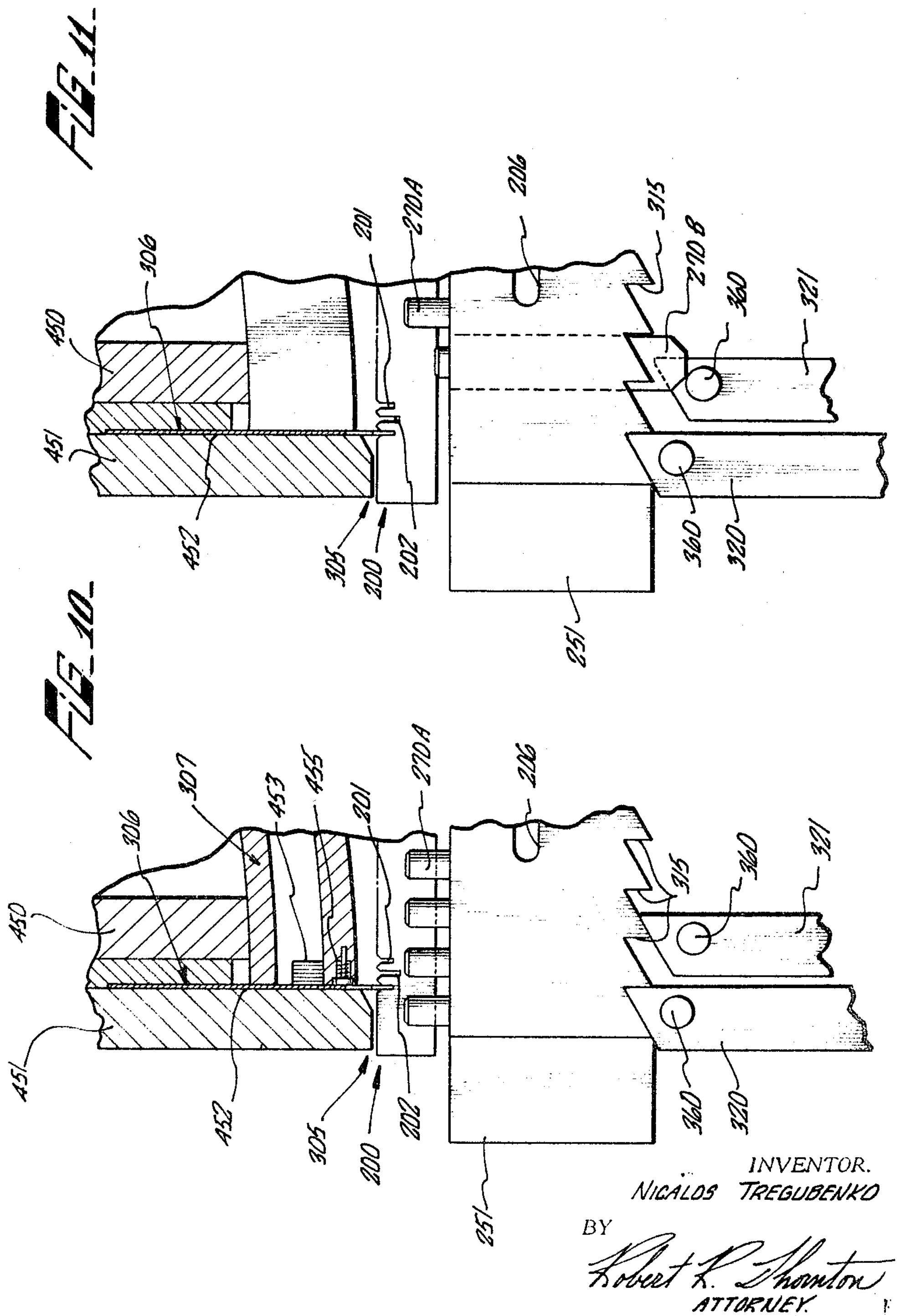
FIGURE 10 is a partial sectional view of the terminal insertion station of the device of FIGURE 8 in operation.
FIGURE 11 is another partial sectional view of the terminal insertion device of FIGURE 8 in operation.

The movement of the plunger 306 is relatively rapid with respect to the movement of the plunger 320. Thus, while the plunger 320 is being withdrawn from the ratchet teeth 315, but still in engagement therewith, so as to prevent movement of the programmer, the terminal is inserted in the boat, and the plunger withdrawn. The plunger 320 is then withdrawn from the ratchet teeth, permitting the programmer to move under the influence of the air cylinder 310. Assuming that a terminal is to be inserted into the next slot 201, the programmer will be programmed as is shown in FIGURE 10, and the plunger 321, which is riding against the ratchet face 315A, will then engage the next ratchet tooth, stopping programmer motion, and closing switch 341. A repetition of the cycle described with respect to the switches 330, 331 then occurs with respect to the switches 340, 341, and actuation of the terminal insertion plunger 351 results in a terminal being inserted in the next recess 201.

If, however, the programmer is programmed so as to skip the insertion of a terminal in the next succeeding recess 201, the programmer will appear as illustrated in FIGURE 11, in that the first pin of the second pin alignment 253 has been depressed. This depressed pin 270B rides against a stop pin 360 on the plunger 321, preventing the plunger 321 from engaging the ratchet tooth 315. The programmer then moves under the influence of the air cylinder 310 to the next succeeding position, in which the plunger 320 is again in engagement with a ratchet tooth 315. It will be noted that the plunger 320 also has a stop pin 360, so that depression of pins in the first pin alignment serves to insert a program into terminal insertion which would otherwise be controlled by the movement of the plunger 320. It will be apparent from FIGURE 9 that the plungers 320, 321 are laterally offset from one another and from FIGURES 10 and 11 that the plungers 320, 321 are longitudinally offset one from another. By having the plungers so offset, the effect to the ratchet tooth spacing is doubled, in that the programmer only moves one-half of the tooth space for each terminal insertion position. In addition, a positive latching effect is obtained for terminal insertion by having the non-operating plunger already seated against the ratchet face 315A, so that programmer movement cannot override the motion stop which is provided by the plunger actuation. Thus, it will be clear that, unless the plunger has been programmed out for the particular terminal insertion, both plungers are almost continuously in contact with the ratchet face 315A, and one plunger is in contact with the ratchet face at all times.

Figure 9:
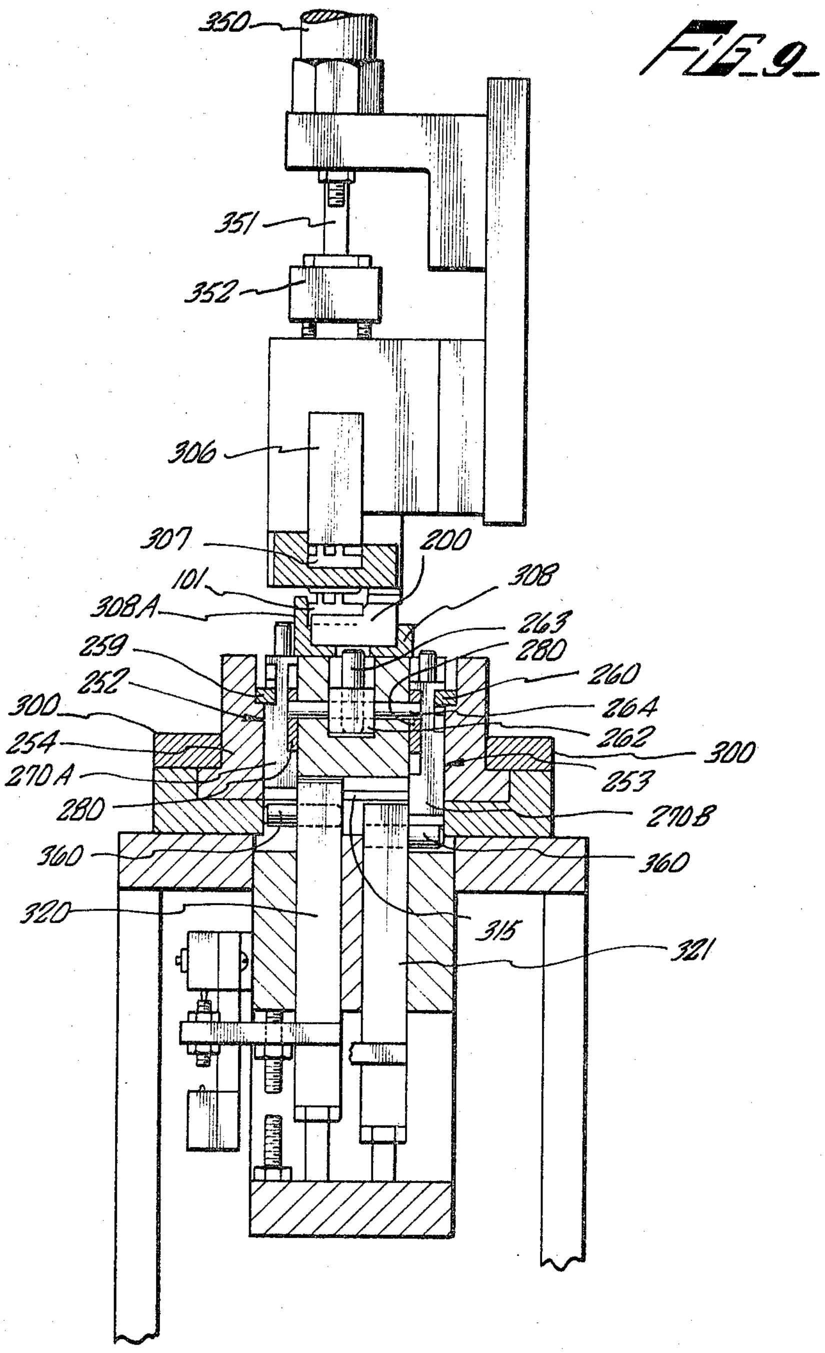
FIGURE 9 is a partial sectional and elevation of the device of FIGURE 8.

FIGURE 9 is an end elevational view of the device of FIGURE 8 taken in section generally at the point of terminal insertion. The component numerical designations of FIGURE 9 correspond to those of the other figures. Reference to FIGURE 9 may be had to better understand the lateral relationship of the various components heretofore described, and reference to FIGURE 9 with respect to the operation set out previously will provide additional information as to the spaced relationship and sequence of operation of the various elements of the present invention.

FIGURES 10 and 11 are illustrative of the two modes of programmer operation, and reference to the foregoing description of device operation, with respect to FIGURES 10 and 11 will serve to clarify the details of the operation of the programmer. In addition, FIGURES 10 and 11 provide a more detailed view of the terminal insertion or feeder station 305. Thus, the plunger 306, which is operable to position the terminals into the carrier, is shown to be held in position by a pair of guide plates 450, 451, within which a blade 452 of the plunger 306 slides. The blade 452 actually contacts individual ones of terminals 453 contained in the track 307 and forces the terminals downwardly into the recesses 201 of the carrier 200. Necessarily, clearance is provided between the lower portion of the track 307 and the guide plate 451 to permit the egress of the terminal 453. It will be noted that this clearance is selected so as to be slightly greater than the width of one terminal but not as great as the width of two terminals. However, to prevent the terminals 453 from simply falling out of the terminal insertion station 305, a spring loaded stop 455 is provided, which is positioned in the track 307 and rides against the guide plate 451. Thus, the stop 455 normally closes the terminal outlet passage formed by the spacing between the guide plate 451 and track 307. However, downward movement of the plunger 306 and therefore the blade 452 forces one of the terminals 453 to override the stop 455 and inserts the terminal so moved into the carrier.

The programmer heretofore described has two rows or alignments of program pins 252, 253. As was pointed out, the utilization of two program pin alignments enables the device to insert terminals at a minimum spacing of one-half the dimension between adjacent ratchet teeth. Such a structure provides additional strength which would otherwise be difficult to obtain where extremely close spacing of terminals is required. However, it should be understood that only a single row of program pins may be utilized, if desired.

It will be noted that throughout the foregoing description, the terminals which are inserted have been terminals designated as 101 in FIGURE 2, that is, "short" terminals, which are disposed in the shallow recesses 201 of the boat 200. In order to insert other, i.e., "long" terminals in the deep recesses 202 of the boat, a second terminal insertion position, which will be the same as that of FIGURES 8 through 11, is utilized, and a second programmer is also utilized in conjunction with the second terminal insertion position. The boat may be transferred from the first terminal insertion position to the second terminal insertion position by any conventional means, such as by powered ram or the like, or by hand, if desired.

When utilizing such an arrangement, it will be obvious to those skilled in the art that the entire operation can be automated, and the device shown in FIGURE 8 illustrates such automation, in part. Thus, in FIGURE 8, a terminal insertion starter switch 400 and terminal insertion stop switch 401 are provided, which control the overall actuation of the various circuits and movements heretofore described. The air cylinder drive shaft 311, in addition to being connected to the programmer 250, is also connected to a terminal insertion actuator arm 402, shown as downwardly depending in FIGURE 8, at the termination of which a start switch actuator stud 403 and a stop switch actuator stud 404 are positioned. The start and stop switches 400, 401 control the direction of movement of the air cylinder 310. Thus, when the start switch actuator stud 403 contacts the start switch, the air cylinder 310 is actuated so as to move the programmer in the manner described previously. When the stop switch actuator stud contacts the stop switch, the programmer, and thus the boat, have completed movement past the terminal insertion station 305. The boat then is moved on to the next terminal insertion station, if any, or removed from the device, by any conventional means, while the stop switch 401 reverses the direction of drive of the air cylinder 310, thus retracting the programmer 250 to a position where another boat may be positioned thereon, as described previously. The sequence of operation is then repeated with respect to the new boat. If desired, the program can, of course, be changed prior to passage of the new boat through the terminal insertion station. Various devices may be utilized to feed the boat into the terminal insertion station, and such devices are not within the scope of the present invention. Similarly, the impressing of the terminal board onto the carrier to remove the terminals from the carrier is also not within the scope of the invention, as it is part of prior art devices designed for such transfer.

I claim:

1. In a terminal insertion device, the combination of:

a source of terminals;

a boat having recesses adapted to receive said terminals;

terminal insertion means, operable when actuated to insert terminals from said source into said boat recesses; and means for selectively actuating said terminal insertion means in accordance with a pre-selected program for terminal arrangement including:

(a) a programmer;

(b) boat movement means controlled by said programmer to move said boat through a pre-selected series of fixed terminal insertion positions; and (c) means actuated when said boat is in a terminal insertion position for actuating said terminal insertion means in which the terminal insertion positions which are preselected are determined by a program carried by the programmer.

2. The combination of claim 1 and in which the programmer includes a series of program pins in alignment, the displacement of selected ones of which constitutes the program.

3. The combination of claim 2 and in which the displacement of any of said program pins inhibits the boat movement control means from stopping said boat at a corresponding fixed terminal insertion position.

4. The combination of claim 3 and in which the boat is moved by movement of the programmer, so that programmer movement carries the boat through the series of fixed terminal insertion positions.

5. The combination of claim 4 and in which the programmer includes a ratcheted portion having ratchet teeth in a pre-selected disposition with respect to the terminal receiving recesses of the boat when carried by the programmer, and in which the boat movement means includes programmer positioning means for engaging the ratchet teeth in said ratcheted portion in successive order so as to stop said programmer at positions corresponding to fixed terminal insertion positions of said boat, said programmer positioning means operation being inhibited by pin displacement.

6. The combination of claim 5 and in which the programmer positioning means includes a plunger which, when actuated, is normally urged against successive ratchet teeth of said programmer, and the boat movement means includes means for alternately actuating and de-actuating said plunger.

7. The combination of claim 6, and in which the plunger has a stop pin extending outwardly therefrom in alignment with the program pins such that, when a selected program pin is displaced, the plunger is inhibited, by its stop pin riding against the displaced program pin, for engaging the ratchet tooth corresponding to the boat recess to which the program pin corresponds, whereby the programmer continues in motion and thus the terminal insertion means does not insert a terminal in said boat recess.

References Cited

UNITED STATES PATENTS

| | | |
|---|---|---|
| 3,231,967 | 2/1966 | Kreinberg et al. |
| 3,302,274 | 2/1967 | Stolz. |
| 3,372,455 | 3/1968 | Howie. |

THOMAS H. EAGER, *Primary Examiner.*

U.S. Cl. X.R.

29—625